United States Patent [19]
Ulich

[11] Patent Number: 5,243,541
[45] Date of Patent: Sep. 7, 1993

[54] IMAGING LIDAR SYSTEM FOR SHALLOW AND COASTAL WATER

[75] Inventor: Bobby L. Ulich, Tucson, Ariz.

[73] Assignee: Kaman Aerospace Corporation, Bloomfield, Conn.

[21] Appl. No.: 919,346

[22] Filed: Jul. 23, 1992

Related U.S. Application Data

[63] Continuation-in-part of Ser. No. 774,663, Oct. 11, 1991.

[51] Int. Cl.[5] .................. H04N 7/00; G06F 15/20
[52] U.S. Cl. ............................. 364/516; 356/5; 358/95
[58] Field of Search ............... 364/516, 433, 561, 569; 356/5; 250/332; 358/95, 99

[56] References Cited

U.S. PATENT DOCUMENTS

| | | | |
|---|---|---|---|
| 4,277,167 | 7/1981 | Eppel | 356/5 |
| 4,754,151 | 6/1988 | Billard | |
| 4,757,200 | 7/1988 | Shepherd | |
| 4,964,721 | 10/1990 | Ulich et al. | 356/5 |
| 4,967,270 | 10/1990 | Ulich et al. | 356/5 |
| 5,034,810 | 7/1991 | Keeler | 356/5 |

FOREIGN PATENT DOCUMENTS

0422415A2 9/1990 European Pat. Off.

*Primary Examiner*—Jack B. Harvey
*Assistant Examiner*—Ellis B. Ramirez
*Attorney, Agent, or Firm*—Fishman, Dionne & Cantor

[57] ABSTRACT

An imaging lidar system for underwater applications is Presented which is well suited for imaging and detecting underwater targets suspended above and on the bottom in shallow and coastal water. The present invention provides the capability for rapid and reliable search, detection, classification and localization of objects in the surf zone which may present hazards to navigation and utilization of coastal areas as well as undesirable effluents and biological fouling of underwater objects. The present invention employs an improved bottom tracker for accurately measuring the distance between the imaging lidar system and the bottom.

4 Claims, 3 Drawing Sheets

IMAGING LIDAR SYSTEM FOR SHALLOW AND COASTAL WATER

CROSS-REFERENCE TO RELATED APPLICATION

This is a continuation-in-part of U.S. application Ser. No. 774,663 filed Oct. 11, 1991.

BACKGROUND OF THE INVENTION

This invention relates generally to a sensor system for remote detection and imaging of objects in a backscattering medium such as water. More particularly, this invention relates to a method and apparatus for detecting, locating and/or imaging underwater objects in shallow water and in coastal regions from an airborne platform using a novel imaging lidar (light detection and ranging) system which improves imaging in such shallow water areas.

It is desirable in a number of military and civilian applications to search a volume within a backscattering medium for the presence of certain targets. For instance, moored or bottom mines deployed in ocean shipping lanes are a hazard to navigating ships used both for military and for commercial purposes. For other civilian applications such as law enforcement on the ocean, it is desirable to detect the presence of submerged fishing nets or drug-carrying containers used in smuggling contraband. In or near harbors and beaches, it is also desirable to detect submerged obstructions, cables, pipelines, barrels, oil drums, etc. In strictly military applications, anti-submarine warfare demands an effective means of detecting and locating submarines.

Presently, cumbersome and time consuming wire line devices must be used for detecting underwater targets from remote airborne locations. These devices are lowered into the water and are easily subject to damage and loss. Also, wire line devices make target searching relatively slow and can only detect targets without providing visual imaging.

An improved and novel system for remote detection and imaging of objects underwater (or objects obscured by other backscattering media which are at least partially transmitting to light such as ice, snow, fog, dust and smoke) from an airborne platform has been described in U.S. Pat. No. 4,862,257 and U.S. Pat. No. 5,013,917, both of which are assigned to the assignee hereof and incorporated herein by reference. The imaging lidar system of U.S. Pat. No. 4,862,257 utilizes a laser to generate short pulses of light with pulse widths on the order of nanoseconds. The laser light is expanded by optics and projected down toward the surface of the water and to an object or target. U.S. Pat. No. 5,013,917 relates to an imaging lidar system intended for night vision.

Imaging lidar systems of the type described hereinabove are also disclosed in commonly assigned U.S. Pat. No. 4,964,721 and U.S. Pat. No. 4,967,270, both of which are incorporated herein by reference. U.S. Pat. No. 4,964,721 relates to an imaging lidar system which controls camera gating based on input from the aircraft onboard altimeter and uses a computer to thereby adjust total time delay so as to automatically track changing platform altitude. U.S. Pat. No. 4,967,270 relates to a lidar system employing a plurality of gated cameras which are individually triggered after preselected time delays to obtain multiple subimages laterally across a target image. These multiple subimages are then put together in a mosaic in a computer to provide a complete image of a target plane preferably using only a single light pulse.

Still other imaging lidar systems are disclosed in commonly assigned U.S. Pat. Nos. 5,029,009 and 5,034,810, both of which are incorporated herein by reference. U.S. Pat. No. 5,029,009 describes an imaging lidar system incorporating an imaging camera having a plurality of gating electrodes on a focal plane and means for producing variable time delay gating across an image viewed by the focal plane. U.S. Pat. No. 5,034,810 relates to a two wavelength lidar imaging system for underwater application utilizing image subtraction to detect passage of internal waves or other anomalies under water.

U.S. Ser. No. 565,631 filed Aug. 10, 1990 which is also assigned to the assignee hereof and fully incorporated herein by reference, relates to an airborne imaging lidar system which employs a plurality of pulsed laser transmitters, a plurality of gated and intensified array camera receivers, an optical scanner for increased field of regard, and a computer for system control, automatic target detection and display generation. U.S. Ser. No. 565,631 provides a means for rapidly searching a large volume of the backscattering medium (e.g., water) for specified targets and improves upon prior art devices in performance as a result of having more energy in each laser pulse (due to simultaneous operation of multiple lasers) and a more sensitive detection system using multiple cameras. The several cameras may be utilized to image different range gates on a single laser pulse or several cameras can be gated on at the same time to provide independent pictures which can then be averaged to reduce the noise level and improve sensitivity. Both of these improvements result in higher signal-to-noise ratio and thus higher probability of detection or greater range of depth capability.

Imaging lidar systems of the type hereinabove discussed are often used in conjunction with computerized automatic target detection (ATD) systems for detecting, locating and identifying targets from a plurality of two dimensional images. Examples of such ATD systems are described in commonly assigned U.S. application Ser. Nos. 565,425 and 565,424, both of which were filed on Aug. 10, 1990 and are incorporated herein by reference.

While the imaging lidar systems described above are well suited for their intended purposes (particularly deep ocean detection), there continues to be a need for imaging lidar systems of this type which have improved operational performance and efficiency in the imaging of underwater targets found in shallow water and/or coastal regions. Such coastal zone surveillance presents an even more challenging problem than deep ocean detection. These difficult problems are encountered as a result of the more challenging conditions in shallow water than those encountered previously in deeper water. These factors include highly variable conditions at the air/water interface such as breaking waves, foam and spray, spatially varying bottom depths both parallel and perpendicular to the coastline and the need for high spatial resolution in order to detect and classify small objects which may be partly hidden in the sand.

Notwithstanding the foregoing, the need for imaging lidar systems, suitable for such coastal and shallow water applications is of great interest to government and commercial activities. For example, there continues to be an increasing need for identification of natural and man made obstacles and hazards in the coastal regions. Obvious applications include identifying favorable sites for construction and utilization of shallow water ports and moorings, surveillance of coastal areas to monitor changes in the surf zone as a result of sediment loading or storm activity, and localization and identification of underwater debris as part of search and rescue operations. Other applications involve the detection of obstacles, mines and hidden explosive charges in shallow waters, offshore and in certain riverine environments. Natural and man made underwater effluent and biological fouling of underwater intake and discharge lines such as that caused by the Zebra mussel in the Great Lakes also needs to be identified.

An imaging lidar apparatus specifically configured to meet the problems associated with imaging objects in shallow water and surf zones is disclosed in U.S. application Ser. No. 774,665 filed Oct. 11, 1991 (which is assigned to the assignee hereof and incorporated herein by reference). This apparatus comprises an airborne imaging lidar system for detection and classification of objects in the surf zone of coastal waters. Preferably, the lidar transmitter is a repetitively pulsed Nd:YAG laser illuminating a portion of the coastal marine area for imaging by a gated camera (e.g., CCD camera) with optimized gating time delay. This prior apparatus also utilizes high spatial resolution and target detection algorithms to classify objects and discriminate against clutter. As a result, this device is capable of rapid search of coastal areas, performs real time automatic target detection, noise rejection and classification, and is capable of both day and night operations under a wide range of sea state and water clarity.

Important features of the apparatus of U.S. Ser. No. 774,663 include multiple imaging cameras to provide high spatial resolution, a bottom tracker to maintain camera gating at the optimum local bottom depth, a specialized beam projection system to minimize brightness variations across the field of view and which optimizes the spatial relationship of the transmitted light to the geometry of the receiver optics, and finally, target detection computers to provide real time detection and classification of surf zone obstacles.

The apparatus of U.S. Ser. No. 774,663 finds significant utility in mine detection. Mines and other obstacles laid in the ocean surf zone are frequently used to deter amphibious assault forces. These mines and obstacles can be laid in place on the beach or on the bottom in shallow water, or can be moored above the bottom in relatively shallow water. Using electro-opical, stand-off detection of the type disclosed in U.S. Ser. No. 774,663, such minefields can be used to counter such coastal defenses by determining the locations and densities of surf zone mines. Thus, mine-free zones may be selected for assualt or, at the very least, relatively low density areas may be selected which will result in minimum casualties.

Notwithstanding these important features and advantages, there continues to be a need for imaging lidar systems of the type described in U.S. Ser. No. 774,663 having even more improved spatial resolution and target locating abilities than is currently available from prior art systems. This need is particularly apparent in the field of mine detection. It is desirable to fly the sensor platform parallel to the water line and somewhat offshore. It is also desirable to search the beach, surf zone, and shallow water zone in a single pass. This is not practical to do with the staring sensor of U.S. Ser. No. 774,663 because of the very large number of pixels required to effectively detect mines as small as six inches in diameter.

The range gate isotemporal contours are spheres, and this means that large instantaneous field of view (IFOV) cameras associated with the system of U.S. Ser. No. 774,663 are not desirable since, in this case, part of the image may be the air above the water, part may be water surface glints, part may be water volume backscatter, part may be ocean bottom reflections, and Part may even be "below" the bottom, thus containing only residual sunlight which leaks through the narrow bandpass filter in the camera which is matched to the laser wavelength. Thus, for two reasons, pixel density and range gate curvature, the camera IFOV must be small.

SUMMARY OF THE INVENTION

The above-discussed and other problems and deficiencies of the prior art are overcome or alleviated by the imaging lidar system of the present invention. In accordance with the present invention, an imaging lidar system of the type described in U.S. Ser. No. 774,663 (a pulsed laser transmitter and one or more range-gated camera receivers) employs a novel bottom detector for providing accurate water depth information. More specifically, the bottom detector comprises a separate, dedicated photodetector which, along with a computer is used to determine the appropriate time delay for operating the range-gated camera(s). During operation, for each laser pulse that the laser transmitter delivers to the target area, the single photodetector of the present invention is used to determine the desired time delay which is then loaded digitally into a programmable delay generator for delaying the camera gate after the next laser pulse.

The present invention thus provides accurate water depth information for the purpose of adjusting receiver delay generators used in airborne imaging LIDAR detection systems. The present invention is particularly well suited for applications where the water depth must be accurately known in order to obtain optimized images for the purpose of detecting targets resting on the ocean bottom in the surf zone or on the beach above the water line. In such applications, the variations in water depth both parallel and perpendicular to the water line must be determined in real time in order to effectively search large areas for mine fields. Additional information such as air visibility, wave height, bottom roughness, bottom reflectance, and water clarity can also be determined using the optical sensor of the present invention.

The above-discussed and other features and advantages of the present invention will be appreciated and understood by those skilled in the art from the following detailed description and drawings.

BRIEF DESCRIPTION OF THE DRAWING

Referring now to the drawings, wherein like elements are numbered alike in the several FIGURES.

DETAILED DESCRIPTION OF THE INVENTION

Detection, classification and localization of objects in the surf zone presents a formidable challenge to remote sensors. The instrument must have high spatial resolution to a adequately classify obstacles and discriminate against clutter, the sensor must be adaptable to rapidly varying bottom depths and sea surface elevations, and must contend with large variability in sea surface conditions (e.g., breaking waves and foam), and be robust with respect to variable conditions in ambient light and water clarity. These requirements are met in the present invention as shown in the block diagram of FIG. 1 by using active illumination (e.g., laser) to overcome variations in natural illumination, a gateable camera for discrimination against ambient noise, automatic gate timing to follow variations in bottom depth, an imaging array to provide high spatial resolution and a high speed computer for automatic target detection, classification and display. A particularly important features of this invention includes the incorporation of a novel bottom detector for providing the desired time delay to a programmable delay generator for delaying the camera gating after each laser pulse. This novel bottom detector is shown in the block diagram of FIG. 2.

For purposes of illustration, the present invention will be described with respect to a sensor configuration for integration into high speed, fixed wing aircraft. However, it will be appreciated that the present invention is intended to include numerous packaging variants to allow deployment on a wide variety of both fixed and rotary wing aircraft (both piloted and unmanned), while requiring minimal modification to the host platform.

I. SYSTEM HARDWARE

Figure 1:
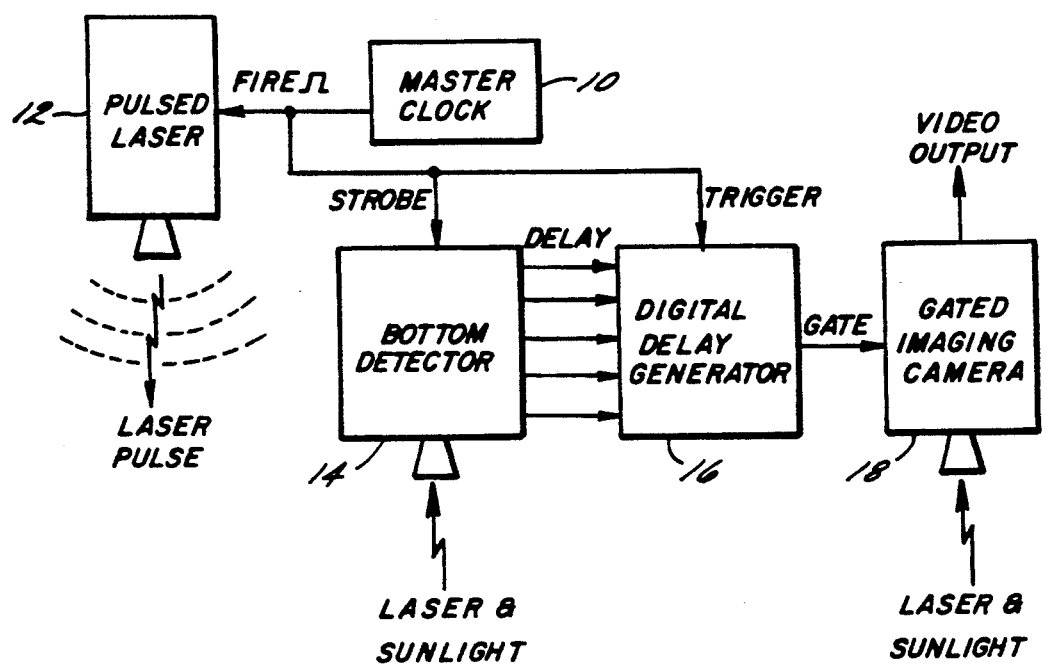
FIG. 1 is a block diagram of an imaging lidar system in accordance with the present invention.

Referring first to FIG. 1, a master clock 10 periodically outputs a pulse which fires the pulsed laser 12, strobes (e.g., triggers) the operation of the bottom detector 14, and triggers the digital delay generator 16 which, after the time delay provided by bottom detector 14 from the previous pulse at this scan angle, gates the electronic shutter of the imaging camera 18, which is typically an intensified CCD.

Figure 2:
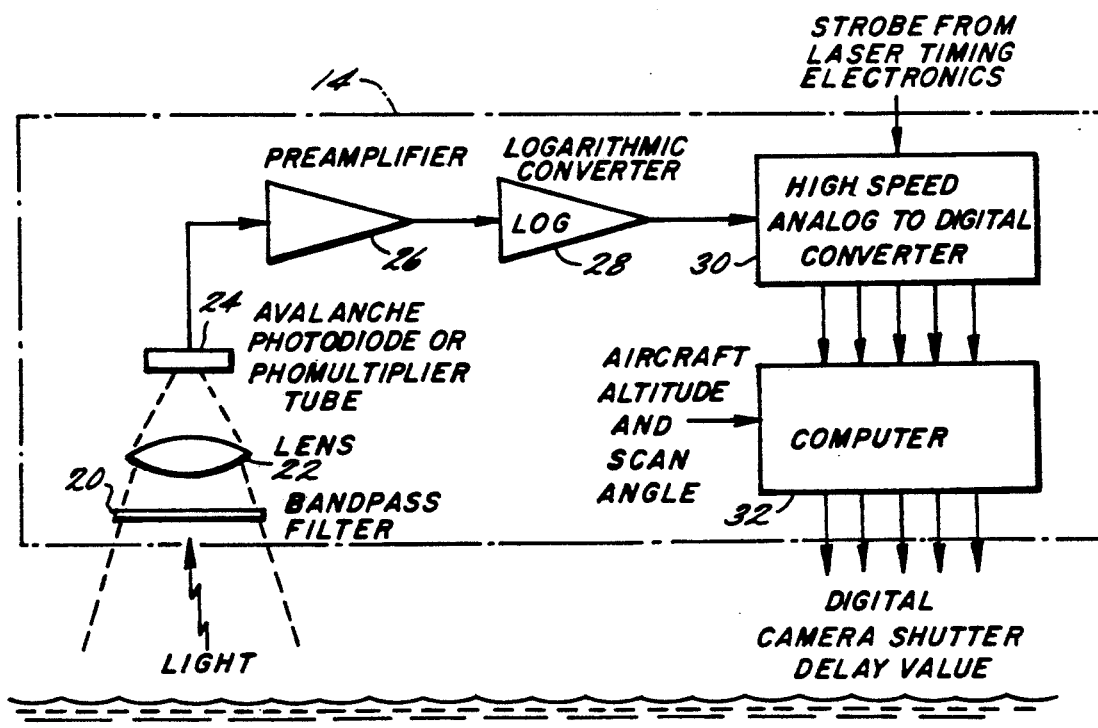
FIG. 2 a block diagram of a bottom detector in accordance with the present invention.

FIG. 2 shows the major elements of bottom detector 14. Light backscattered from below the aircraft first passes through a narrow spectral bandpass filter 20 to remove unwanted sunlight. Next, a lens 22 focuses the light upon a high speed photodetector 24 such as an avalance photodiode or a photomultiplier tube. The electrical current produced by the photodetector is amplified and converted to a voltage signal in a transimpedance preamplifier 26. Next, an output voltage proportional to the logarithm of the input signal is produced by a logarithmic converter/amplifier 28. This signal is then repetitively converted to a digital value in a high speed analog-to-digital converter 30. A fixed number of digital values are measured for each laser pulse starting immediately after the laser is fired. This data is processed in a built-in (or external) digital computer 32 (using scanner angle and aircraft pitch, roll, and altitude information) to determine the desired information including water depth. The bottom detector optical axis is matched to that of the imaging camera 18 and the bottom detector optical axis will have a smaller FOV, so the depth measurement from bottom detector 18 corresponds to an average depth over the central portion of the camera image.

Figure 3:
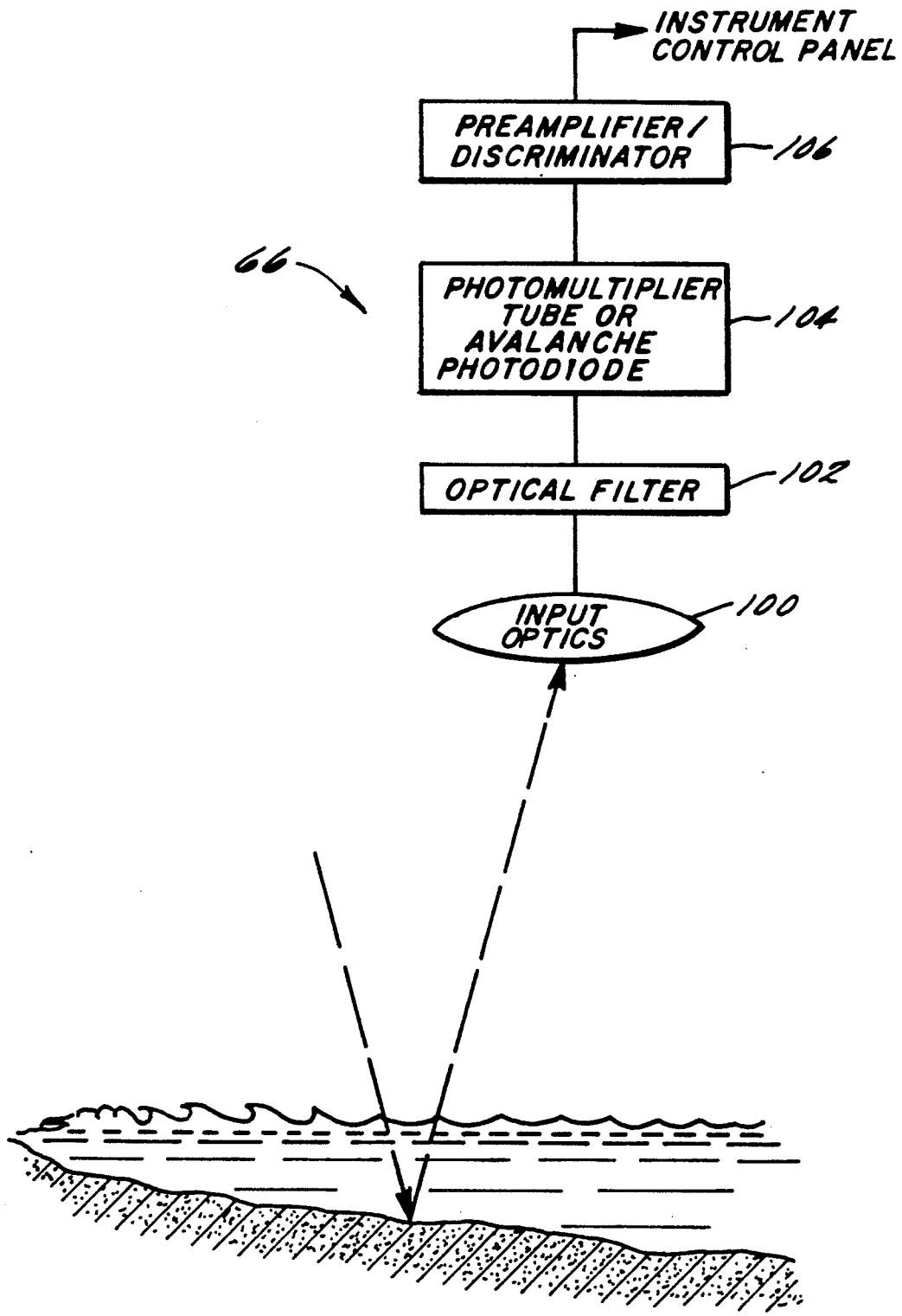
FIG. 3 is a block diagram of a bottom detector in accordance with the prior art.

Turning to FIG. 3, the bottom tracker disclosed is U.S. Ser. No. 774,663 (corresponding to FIG. 5 of U.S. Ser. No 774,663) is shown at 66. As described in U.S. Ser. No. 774,663, bottom tracker 66 includes input optics 100, a narrow bandpass optical filter 102 matched to the laser wavelength, a photomultiplier tube or avalance photodiode 104 and a preamplifier/discriminator 106 for detecting the bottom reflection.

It will be appreciated that the bottom detector 14 of the present invention differs from the bottom detector shown in FIG. 3 primarily by the addition of logarithmic converter 28, high speed A/D converter 30 and computer 32 (as well as the strobe input from the laser timing electronics). As will be discussed in more detail hereinafter, these differences provide the present invention with important features and advantages relative to the bottom detector of U.S. Ser. No. 774,663 including dramatically improved bottom detection and the ability to detect a myriad of other important information including wave height, bottom roughness, bottom reflectance, water clarity and air visibility.

The remainder of the lidar system of this invention is identical to the imaging lidar system of U.S. Ser. No. 774,663 including a scanning mirror which can scan the transmitted beam and receiver fields of view along a common axis.

II. BOTTOM DETECTOR OUTPUT

Figure 4:
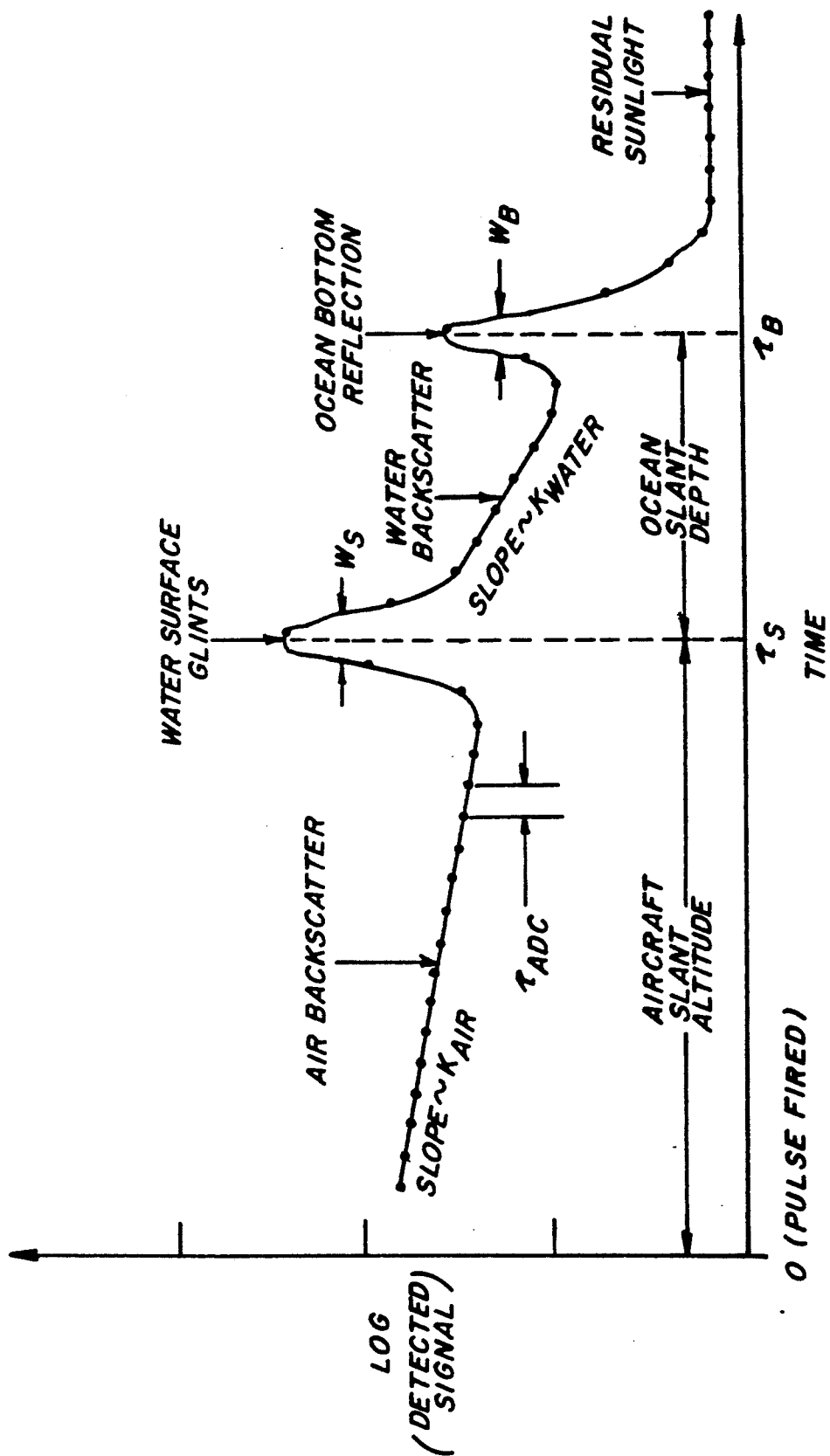
FIG. 4 is a graphical representation of the signal output from the bottom detector of FIG. 2.

A typical temporal signature of the photodetector 24 output signal from bottom detector 14 is shown in FIG. 4. It will be appreciated that an enormous amount of information is contained in this signal including water depth. The parameters which effect this signal are listed below (with reference to FIG. 4):

1. Laser pulse width—The full width at half maximum of the intensity of the laser pulse is denoted by $\tau_L$.

2. Signal sampling period—The period for digitizing the photodetector signal is denoted by $\tau_{ADC}$ which is selected to be about one-half the laser pulse width $\tau_L$. The analog-to-ditigal integration width (sampling aperture) is denoted by $\delta_{ADC}$ which will be $\leq \tau_{ADC}$.

3. Detector impulse response width—The temporal full width at half maximum of the signal from the photodetector which is fed into the input of the analog-to-digital converter 30 is denoted by $\tau_D$. The detector and logarithmic amplifier electronics should have temporal bandwidth so that $\tau_D << \tau_L$.

4. LIDAR System Constant—The bottom detector 14 output signal I has a value called the LIDAR System Constant $I_o$ which is the signal detected when a 100% reflecting Lambertian surface is placed at zero range.

5. Air backscatter coefficient—The air between the sensor and the water will backscatter laser light with a coefficient given by $\beta_{air}$ which has units of $m^{-1}sr^{-1}$. For ease of understanding, it will be assumed that the LIDAR system is monostatic and the backscattering angle is 180°.

6. Air diffuse attenuation coefficient—The air will attenuate the laser beam with a one-way coefficient of $K_{air}$ which has units of $m^{-1}$. The two-way loss over a path of length L is given by $\exp(-2 \cdot K_{air} \cdot L)$.

7. Aircraft slant altitude—If the aircraft altitude is A feet, then the slant path length to the water surface is equal to $A_s = A/\cos(\theta)$ where $\theta$ is the angle from nadir of the sensor line of sight. The nadir viewing angle $\theta$ will vary repetitively with time due to the sensor scanner motion. It will be appreciated that $\cos(\theta) = \cos$ (pitch angle) cos (roll angle).

8. Average water glint reflectance—Averaged over the bottom detector field of view the (assumed Lambertian) reflectance of the sea surface is given by $\Gamma_S$. Of course, small patches of the surface will provide very bright glints due to the maximum 2% specular reflectance of the air/water interface. It has been observed that the spatially averaged effective reflectance will be far below the peak specular return, although white surface foam and breaking waves will also increase the effective surface reflectance.

9. Water surface roughness—The temporal width of the return light pulse incident on the bottom detector from the water surface reflection is given by $\tau_{SR}$ when the outgoing laser pulse has infinitely narrow temporal width (i.e., it is a Dirac delta function). This width will be determined by the RMS wave height value and by the range variation of the mean water surface over the bottom detector field of view. Thus, the width $\tau_{SR}$ will be affected by the slant altitude and by the nadir viewing angle $\theta$. If the bottom detector has a "rectangular" angular field of view which has half angles of $\theta_{||}$ and $\theta_{\perp}$ in the directions parallel and perpendicular to the scanning plane (which is generally in the roll plane of the aircraft), then the minimum slant range is $$A_{min} = A_s/\cos(\theta - \theta_{||}).$$

Similarly, the maximum one-way slant range is $$A_{max} = [A_s/\cos(\theta + \theta_{||})] \cdot [1 + \sin^2(\theta_\perp)]^{\frac{1}{2}}.$$

The two-way round trip air propagation time delay $\tau_S$ thus varies from $[c/(2 \cdot n_{air})] \cdot A_{min}$ to $[c/(2 \cdot n_{air})] \cdot A_{max}$ where c is the speed of light in a vacuum (2.997925.10$^8$ m/s or 0.98357 feet/nanosecond).

As shown in FIG. 4, the apparent width of the water surface glint feature $W_S$ is the convolution of the laser pulse width $\tau_L$, the water surface roughness width $\tau_{SR}$, the detector impulse response width $\tau_D$, and the analog-to-digital integration width $\delta_{ADC}$. It will be appreciated that a RMS wave height estimate will be meaningful only if the field of view of the bottom detector is small in the direction parallel to the scan (i.e., $\theta_{||}$ is small) and if the sensor viewing angle from nadir $\theta$ is also small. The half angle of the IFOV in the direction perpendicular to the scan can be larger, leading to a rectangular IFOV with a large aspect ratio ($\theta_\perp >> \theta_{||}$).

10. Water backscatter coefficient—The water volume will backscatter laser light with a coefficient given by $\beta_{water}$ which has units of m$^{-1}$sr$^{-1}$. For ease of understanding, it will again be assumed that the LIDAR system is monostatic and the backscattering angle is 180°.

11. Water diffuse attenuation coefficient—The water will attenuate the laser beam with a one-way coefficient of $K_{water}$ which has units of m$^{-1}$. The two-way loss over a path of length L is given by $\exp(-2 \cdot K_{water} L)$.

12. Water slant depth—If the sensor line of sight impinges on the water surface at an angle $\theta$ with respect to the normal (recall that $\theta$ is also the sensor nadir viewing angle), then the light ray path in the water volume is refracted such that its angle from a vertical direction is given by $\theta' = \sin^{-1}[\{\sin(\theta)\}/n_w)]$. The index of refraction of sea water is given by $n_w = 1.34295$. Thus, if the water vertical depth is $d_w$ then the slant depth is $$d_s = d_w/\cos(\theta') = d_w \cdot n_2[n_2 2 - \sin^2(\theta)]^{-\frac{1}{2}}.$$

13. Bottom Reflectance—Averaged over the bottom detector field of view, the (assumed Lambertian) reflectance of the sea bottom (or of the sand on the beach) is given by $\Gamma_B$. For white sand $\Gamma_B$ can be more than 80% and for black mud $\Gamma_B$ can be less than 5%.

14. Bottom roughness—The temporal width of the light pulse incident on bottom detector 14 from the ocean bottom reflection 14 is given by $\tau_{BR}$ when the outgoing laser pulse has infinitely narrow temporal width (i.e., it is a Dirac delta function). This width will be determined by the RMS bottom height variations and by the range variation of the mean bottom surface over the bottom detector field of view. Thus, the width $\tau_{BR}$ will be affected by the slant altitude and by the nadir viewing angle $\theta$. The minimum slant range in the water is $$A'_{min} = d_w n_w [n_w 2 - \sin^2(\theta - \theta_{||})]^{\frac{1}{2}}.$$

Similarly, the maximum one-way slant range in the water is $$A'_{max} = d_w n_w [n_w 2 - 1 + \cos^2(\theta + \theta_{||}) \cdot \cos^2(\theta_\perp)]^{-\frac{1}{2}}.$$

Thus, the total round trip propagation time to the bottom $\tau_B$ varies from a minimum of $$\tau_B|_{min} = [c/(2 \cdot n_{air})] A_{min} + [c/(2 \cdot n_{water})] \cdot A \cdot_{min}$$

to a maximum of $$\tau_B|_{max} = [c/(2 \cdot n_{air})] \cdot A_{max} + [c/(2 n_{water})] \cdot A'_{max}.$$

As shown in FIG. 4, the apparent width of the ocean bottom reflection feature $W_B$ is the convolution of the laser pulse width $\tau_L$, the bottom roughness width $\tau_{BR}$, the detector impulse response width $\tau_D$, and the analog-to-digital integration width $\delta_{ADC}$. In order to accurately determine the best depth estimate, it is important to limit the IFOV of bottom detector 14 in the direction parallel to the scan (i.e., keep $\theta_{||}$ small) so that the ocean bottom reflection pulse is fairly narrow.

15. Residual sunlight—When no laser light is detected, sunlight which passes through spectral bandpass filter 20 in bottom detector 14 will cause a detected signal $S_{sun}$. This is indicated on the far right hand side of FIG. 4. $S_{sun}$ is effectively a constant offset in the detector output.

III. COMPUTER SYSTEM SOFTWARE

After a sufficient number of analog-to-digital conversions have been completed, computer 30 will perform a least squares fit of the variables in the time delay equation to optimally estimate their values. Then the time delay corresponding to the opening of the camera shutter is computed so that the camera range gate is approximately centered on the ocean bottom (the camera shutter should be opened at the time equal to $\tau_B$ minus half the camera gate width). Thus, half the gate is above the bottom and half is below the bottom. This gate timing maximizes the likelihood that the reflection from the bottom will fill the entire camera image and thus that mine-like objects resting on the bottom will be imaged. In all calculations, the assumption is made that, for any given scanner position, the ocean depth will not change appreciably (i.e., by more than one-half the gate width) over the distance parallel to the water line that the platform travels during the time between scanner looks at the same angle. This condition is generally met in areas otherwise suitable for amphibious assault.

IV. COMPUTER PROCESSING

Preferably, matrix calculations are used to perform the least squares fit to the one-dimensional vector of measured data. If the input data vector has length $N_D$ and the number of variables is $N_V$, then a $N_D$ by $N_V$ matrix multiplication must be performed for each laser pulse. This is well within the capabilities of a microcomputer, since the pseudo-inverse matrix used in the multiplication is precalculated once and stored in the bottom detector computer 32. The digital delay generator 16 is then set to the least squares fitted value of $\neq_B$, which is the total round trip delay time over the slant path from the laser pulse emission to the bottom return.

The equations used to fit the sequence of data points $V_i$ are as follows:

For $i=1$ to $N_D$:

$$V_i = C_0 + C_1 \cdot \log_{10}(I_i)$$

where $C_0$ and $C_1$ are known constants which describe the logarithmic amplifier transfer function.

For $t > \tau_L$:

$$\begin{aligned}
I_i = & S_0 + \\
& S_1 \cdot [\exp - (K_1 t)] \cdot [NERF(t,0,\tau_L) - \\
& NERF(t, \tau_S, W_S)] + \\
& S_2 \cdot \exp\{-4\ln 2 \ [(t - \tau_S)/W_S]^2\} + \\
& S_3 \cdot \exp[-K_3(t - t_S)] \ [NERF(t,\tau_S,W_S) - \\
& NERF(t,\tau_B,W_B)] + \\
& S_4 \cdot \exp\{-4\ln 2 \ [(t - \tau_B)/W_B]^2\}
\end{aligned}$$

where
$(\tau_{LIDAR})^2 = (\tau_L)^2 + (\tau_D)^2 + (\delta_{ADC})^2$
$(W_S)^2 = (\tau_{LIDAR})^2 + (\tau_{SR})^2$
$(W_B)^2 = (\tau_{LIDAR})^2 + (\tau_{BR})^2$
$\tau_S \leq \tau_B$
$W_S \geq \tau_{LIDAR}$
$W_B \geq \tau_{LIDAR}$
$K_1 = K_{air} \cdot c/n_{air}$
$K_3 = K_{water} \cdot c/n_{water}$ In this equation NERF(t,T,W) is a normalized error function (of time t) which is the one-dimensional convolution of a step function at time=T with a Gaussian of full-width-at-half-maximum =W. NERF(t,T,W) varies smoothly from zero at $t = -\infty$ to unity at $t = \infty$ and is symmetrical about $t = T$ where it has a value of one-half:

| t | T | W | NERF (t,T,W) |
|---|---|---|---|
| $-\infty$ | $\neq +/- \infty$ | $0 \leq W < \infty$ | 0 |
| T | $\neq +/- \infty$ | $0 \leq W < \infty$ | 0.5 |
| $\infty$ | $\neq +/- \infty$ | $0 \leq W < \infty$ | 1 |

Also NERF(t,T,W) = $\{1 + \text{erf}[(t-T)/(0.478 \ W)]\}/2$.

For simplicity in deconvolution, all temporal functions are assumed to be Gaussians.

The first term in the equation for $I_i$ represents the residual sunlight, the second term is the air volume backscatter, the third term is the water surface glints, the fourth term is the water volume backscatter, and the fifth term is the bottom reflection.

The computer will find $S_0$, $S_1$, $S_2$, $S_3$, $S_4$, $\tau_S$, $W_S$, $\tau_B$, $W_B$, $K_1$, and $K_3$ by least squares using the above equations and constraints. $K_{air}$ can be found directly from $K_1$ and $K_{water}$ can be found from $K_3$. Since $\tau_{LIDAR}$ can be directly and previously measured, $\tau_{SR}$ can be found from $W_S$ and $\tau_{BR}$ can be found from $W_B$ using the above equations.

The aircraft altitude is given by $$\text{Altitude} = \tau_S \cdot \cos(\theta) \cdot c/(2 \cdot n_{air})$$

and the depth is given by $$\begin{aligned}
\text{Depth} &= (\tau_B - \tau_S) \cdot \cos(\theta') \cdot c/(2 \cdot n_{water}) = \\
& (\tau_B - \tau_S) \cdot c/[2 \cdot (n_{water})^2] \ \{(n_{water})^2 - [\sin(\theta) \cdot n_{air}]^2\}^{\frac{1}{2}}.
\end{aligned}$$

Finally, the remaining parameters of interest can be found by simultaneously solving the following equations for $I_o$, $\beta_{air}$, $\Gamma_S$, and $\Gamma_B$:

$$S_1 = I_\sigma \beta_{air} \pi \cdot \tau_{lidar} c/n_{air}$$

$$S_2 = I_\sigma \exp(-K_1 \cdot \tau_S) \cdot \Gamma_S$$

$$S_3 = I_\sigma \exp(-K_1 \cdot \tau_S) \cdot (1 - \Gamma_S)$$
$$\beta_{water} \pi \cdot \tau_{LIDAR} \cdot c/n_{water}$$

$$S_4 = I_\sigma \exp(-K_1 \cdot \tau_S) \cdot (1 - \Gamma_S) \cdot \exp[-K_3(\tau_B - \tau_S)] \cdot \Gamma_B$$

IV. AUXILIARY DATA USES

The water depth is measured in a two-dimensional array of points due to the side-to-side scanning of the sensor FOV and to the forward speed of the aircraft. If the aircraft location is known, for instance using a Global Positioning System receiver, then a bathymetric map may be assembled after the mission and used to assess the physical difficulties of assault routes.

The least-squares fitted values of the other parameters such as the width of the water surface glints and the ocean bottom reflection are used to estimate the RMS height variations. The diffuse attenuation coefficients are also used to estimate air visibility and water clarity. These can also be combined with the GPS position data to produce maps showing the variability of each parameter over the area surveyed.

As discussed above, the bottom tracker 14 of this invention provides important features and advantages relative to the bottom detector 66 of U.S. Ser. No. 774,663 (see FIG. 3). For example, the employment of logarithmic converter 28 allows the use of a wide range of laser power, and aircraft altitude and allows a wider range of water transmissivities and bottom reflectances to be measured.

Another feature of this invention relates to the elimination of the discriminator 106. The drawback of discriminator 106 (which acts as a comparator) is that if the water is too deep, the glint off the water surface (at $\tau_S$ in FIG. 4) may overwhelm or confuse and thereby mask the return reflection from the bottom (at $\tau_B$ in FIG. 4) resulting in a false reading (e.g., the bottom detector will measure the distance to the water surface rather than bottom). In contrast, using the digital converter 30, computer 32 and the algorithms described above, the present invention will accurately distinguish between water surface glint and bottom reflection. In fact, the bottom detector 14 of this invention will produce the output curve of FIG. 4 together with all of the information set forth in FIG. 4 for each laser pulse. Thus, not only does the present invention provide an accurate measurement of the bottom, but additionally it provides accurate information on air visibility, water depth, water clarity, wave height, bottom roughness and bottom reflectance.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An apparatus for detecting and imaging from an airborne platform an object at least partially enveloped by water, the water having a surface and a bottom, comprising:
    pulsed light source generating means for selectively generating pulses of light from the airborne platform;
    projecting means for projecting said short pulses of light toward the water and at an object enveloped by the water;
    bottom detector means for measuring the distance between the surface and the bottom of the water defining total water depth;
    camera means for detecting said pulses of ligh reflected back from said object, said camera means being gated open by input from digital delay generator means, said camera means being gated open after a selected time delay corresponding to the roundtrip propagation time of said light pulses to and from said object;
    computer means for calculating said selected time delay based on input data which includes the total water depth from said bottom detector means, said computer means inputting said selected time delay to said delay generator means thereby automatically compensating for variations in total water depth and platform altitude; and
    converting means for converting said detected pulses of light to a video image of said object; and
    wherein said bottom detector means comprises;
    photodetector means;
    preamplifier means in electrical communication with said photodetector means;
    logarithmic converter means for receiving output signals from said preamplifier means;
    analog to digital (A/D) converter means for receiving analog output signals from said logarithmic converter means and converting said analog signal to digital output signals; and wherein
    said computer means processes said digital output signals for calculating said selected time delay.

2. The apparatus of claim 1 wherein said computer includes:
    executable algorithm means for converting an output signal from said bottom detector means to the graph of FIG. 4.

3. The apparatus of claim 1 including:
    optical filter means, said photodetector means being in optical communication with said optical filter means.

4. The apparatus of claim 1 wherein said airborne platform has instrumentation for measuring platform attitude and wherein:
    said computer means monitors the attitude of the airborne platform in response to attitude input from the instrumentation and wherein said computer means calculates said selected time delay based on input data which includes the attitude input from said instrumentation.

* * * * *

UNITED STATES PATENT AND TRADEMARK OFFICE
CERTIFICATE OF CORRECTION

PATENT NO. : 5,243,541  
DATED : September 7, 1993  
INVENTOR(S) : Bobby L. Ulich Page 1 of 1

It is certified that error appears in the above-identified patent and that said Letters Patent is hereby corrected as shown below:

<u>Title page,</u>  
ABSTRACT, line 2, delete "Presented" and insert therefor -- presented --.

<u>Column 4,</u>  
Line 11, delete "Part" and insert therefor -- part --.  
Line 63, after "FIG. 2" insert -- is --.

<u>Column 6,</u>  
Line 54, delete the comma "," and insert therefor a period -- . --.  
Line 68, after "(pitch angle)" insert -- . --.

<u>Column 7,</u>  
Line 67, delete "$d_s=d_w/\cos(\theta\text{'})=dw\cdot n_2]n_22—\sin^2(\theta)]^{-1/2}$" and insert therefor -- $d_s=d_w/\cos(\theta\text{'}) = d_w\cdot n_w]n_w2—\sin^2(\theta)]^{-1/2}$ --.

<u>Column 8,</u>  
Line 28, delete "$\cdot A\cdot_{min}$" and insert therefor -- $\cdot A^*_{min}$ --.

<u>Column 9,</u>  
Line 14, delete "$\neq B$" and insert therefor -- $\tau_B$, --.  
Line 32, delete "$S_2\cdot\exp\{—4\ln^2[(t—\tau_s)/Ws]^2\} +$" and insert therefor -- $S_2\cdot\exp\{-4\ln2[(t-\tau_s)/Ws]^2\}$ --.  
Line 36, delete "$S_4\cdot\exp\{—4\ln^2[(t—\tau_B)/W_B]^2\} +$" and insert therefor -- $S_4\cdot\exp\{-4\ln2[(t-\tau_B)/W_B]^2\}$ --.

Signed and Sealed this

Second Day of April, 2002

*Attest:*

*Attesting Officer*

JAMES E. ROGAN  
*Director of the United States Patent and Trademark Office*